Feb. 22, 1966  W. A. DUCKETT  3,236,339
VIBRATION DAMPERS

Filed July 13, 1964  3 Sheets-Sheet 1

INVENTOR
WILLIAM A. DUCKETT

BY Watson, Cole, Grindle & Watson
ATTORNEYS

Feb. 22, 1966  W. A. DUCKETT  3,236,339
VIBRATION DAMPERS

Filed July 13, 1964  3 Sheets-Sheet 2

INVENTOR
WILLIAM A. DUCKETT

BY Watson, Cole, Grindle & Watson
ATTORNEYS

Feb. 22, 1966 W. A. DUCKETT 3,236,339
VIBRATION DAMPERS
Filed July 13, 1964 3 Sheets-Sheet 3

INVENTOR
WILLIAM A. DUCKETT

BY
Watson, Cole, Grindle & Watson
ATTORNEYS

United States Patent Office 3,236,339
Patented Feb. 22, 1966

3,236,339
VIBRATION DAMPERS
William Arthur Duckett, Ossett, England, assignor to Woodhead-Monroe Limited, Ossett, England, a company of Great Britain
Filed July 13, 1964, Ser. No. 382,256
Claims priority, application Great Britain, July 15, 1963, 28,010/63
4 Claims. (Cl. 188—100)

This invention relates to vibration dampers, and is more particularly concerned with the so-called monotube telescopic type of hydraulic vibration dampers as used, for example in vehicle suspension systems, and usually called shock absorbers, which term will therefore be used herein for convenience.

According to the present invention a hydraulic shock absorber includes a cylinder closed at one end, a piston assembly arranged to slide in the cylinder and connected to a piston rod extending through a fluid seal in the other end, while passages in the piston are arranged to permit but afford resistance to the flow of fluid from one side thereof to the other, wherein the spaces between the piston and the ends of the cylinder are occupied by liquid and gas under pressure which, during operations at least, are in the form of an emulsion having a degree of elasticity such in relation to the resistance offered to flow through the appropriate passage or passages that, for relatively small and/or slow movements of the piston relatively to the cylinder in at least one direction little compression of fluid on the appropriate side of the piston occurs, whereas for longer and/or more rapid movements compression of the fluid on the appropriate side of the piston occurs to a point at which the fluid becomes substantially incompressible and therefore with further movement acts as an incompressible fluid.

The ratio of liquid to gas is preferably not less than 7 to 1 and not greater than 9 to 1 and the pressure to which the shock absorber is charged with gas is preferably not less than 80 p.s.i. and not greater than 500 p.s.i. at 20° C. Moreover, the fluid tight seal through which the piston rod extends may act as a one-way valve arrangement so as to act as a non-return valve through which the cylinder can be charged under pressure. Such a fluid seal may be of the form shown in the present applicant's British Patent No. 920,959, that is to say it may comprise a ring of flexible resilient material surrounding the piston rod having an inner surface of frusto conical shape the larger diameter end of which is of greater diameter than the piston rod and faces the outer end of the piston rod while the smaller diameter end is in a state of circumferential tension. The part of the ring which surrounds the piston rod and is of smaller diameter may be externally tapered and urged radially inwards by a compression member under the action of spring means to ensure the seal is fluid tight.

Preferably the fluid seal is contained in a fluid reservoir communicating with the interior of the cylinder through a second sealing ring surrounding the piston rod at its inner end and acting as a one-way valve to permit fluid to enter the reservoir from the cylinder but preventing its exit, the reservoir being provided with a relief passage communicating with the cylinder to drain off excess fluid. The second sealing ring may have an outwardly directed lip constituting the one-way valve.

A shock absorber according to the present invention may have the piston rod formed for attachment to the sprung mass of a vehicle on which it is to be incorporated and the cylinder formed for attachment to the unsprung mass.

The piston assembly may comprise a piston having two sets of transfer passages passing through it and respectively controlled by valves so that the valves which control the respective passages also control the respective damping characteristics during inward and outward movement of the piston relatively to the cylinder. The term inward is to be taken as meaning towards the closed end and the term outward is to be taken as meaning towards the fluid seal. Preferably bleed notches are associated with each passage or set of passages to allow a limited flow of fluid without opening of the valves.

In one construction the piston assembly may comprise two pistons arranged in series each containing transfer passages, the passages in each piston being controlled by its own valves so that the damping characteristics are determined by the joint action of valves controlling the passages in the two pistons. Each piston may, for example, have two sets of transfer passages and associated valving, one set for controlling the flow of fluid in one direction and the other set for controlling the flow of fluid in the other direction. Each piston and its associated valving may comprise similar parts similarly arranged but with the pistons back to back so that one piston can control the backing characteristics during compression and the other during rebound.

In one arrangement the transfer passages are spaced above the piston axis in two sets, one set being at a greater radius from the centre of the piston than the other.

Various constructions according to the present invention will now be described by way of example with reference to the accompanying drawings in which.

Figure 4:
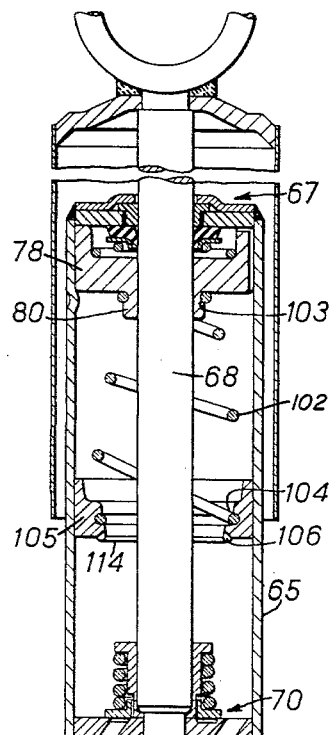
Figure 5:
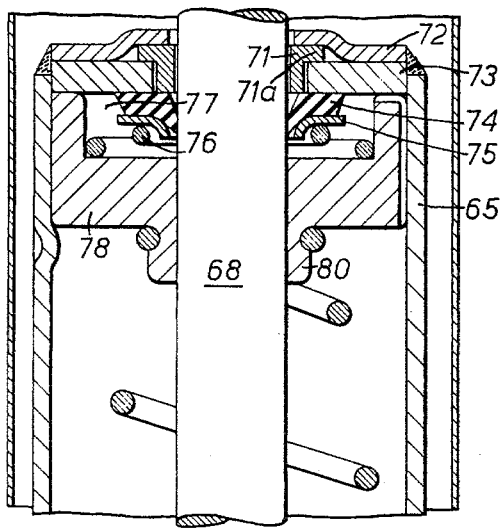
Figure 6:
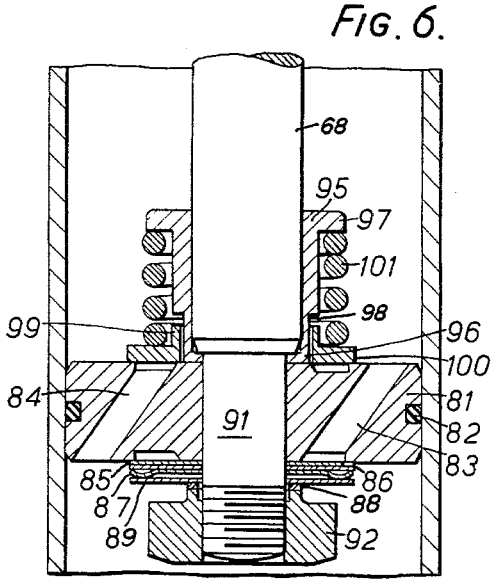
Figure 7:
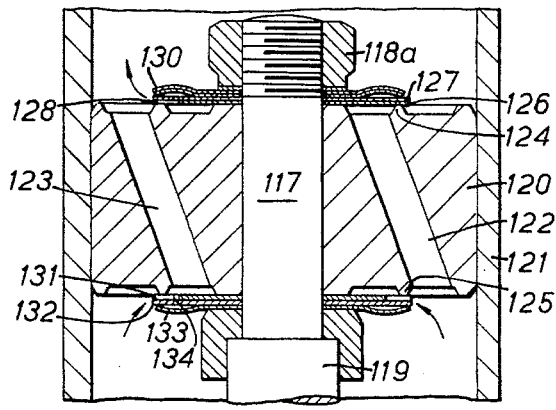
Figure 8:
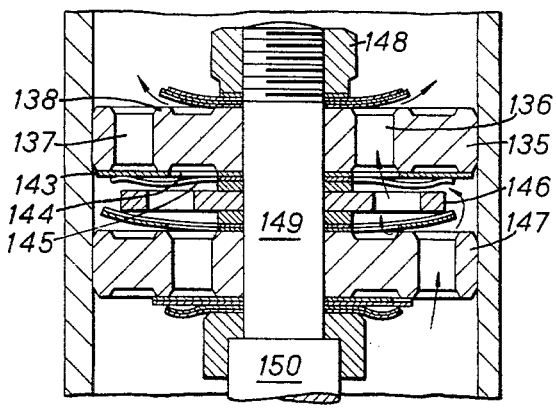
Figure 9:
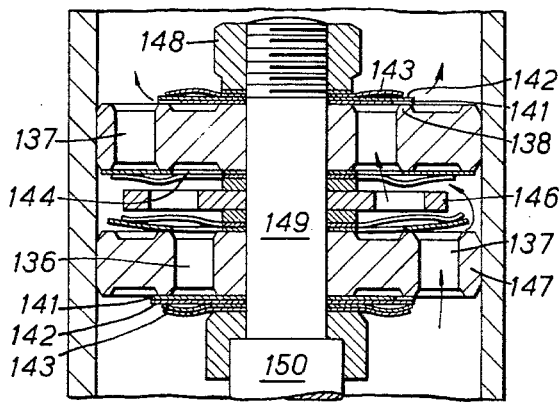

FIGURE 4 is a sectional elevation through an alternative form of monotube telescopic hydraulic shock absorber according to the present invention, FIGURE 5 is an enlarged view of the sealing unit shown in FIGURE 4, FIGURE 6 is an enlarged view of the valving arrangement shown in FIGURE 4, FIGURE 7 is a section through one form of valving which may be used in connection with the present invention, FIGURE 8 is a section through an alternative form of valving showing the positions occupied by the various components when the piston is moving at relatively high speed and, FIGURE 9 is a similar view to FIGURE 8 but showing the positions occupied by the components when the piston is moving at a relatively slow speed.

Figure 1:
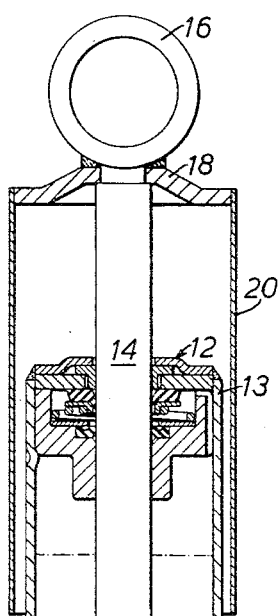
FIGURE 1 is a sectional elevation through a monotube telescopic hydraulic shock absorber according to the present invention.
Figure 2:
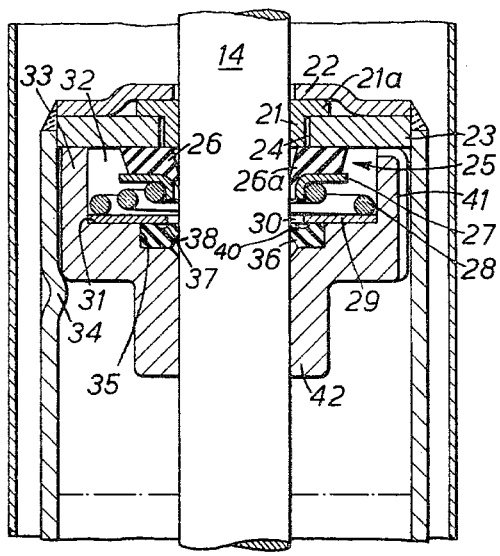
FIGURE 2 is an enlarged view of the sealing unit shown in FIGURE 1.
Figure 3:
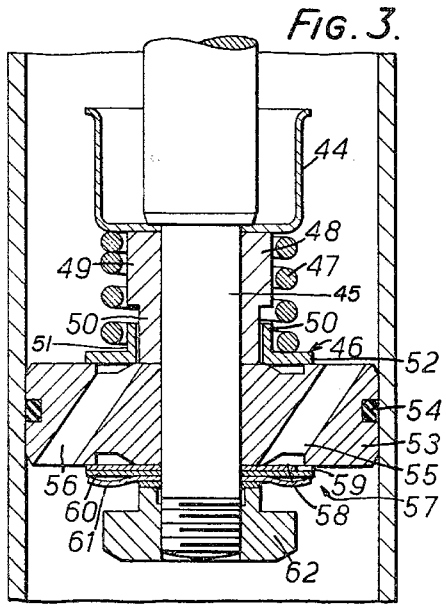
FIGURE 3 is an enlarged view of the valving arrangement shown in FIGURE 1.

As shown in FIGURES 1 to 3 the shock absorber comprises a working cylinder 10 closed at its lower end 11 and extending through a fluid tight sealing arrangement generally indicated at 12, in its upper end 13 is a piston rod 14 having mounted on the lower end thereof a piston and valve arrangement generally indicated at 15. The piston rod and cylinder carry sockets 16 and 17 for attachment respectively to the parts between which vibration is to be damped, for example, the sprung and unsprung parts of a vehicle. Mounted immediately below the upper socket 16 is the upper closed end 18 of a dust shield in the form of a concentric cylinder 20 of slightly larger diameter than the working cylinder 10 and of such length that when the working cylinder and piston are in their fully extended positions its lower end covers the fluid tight seal 12.

As shown more clearly in FIGURE 2 the fluid tight seal comprises an annular ring 21 coated with self lubricating material such as sintered bronze acting chiefly as a dirt excluder having a radially directed flange 21a which is held between a generally cup shaped member 22 forming the upper end of working cylinder 10 and a retaining ring 23 the axial length of which is the same as that of the part of the ring 21 below the flange and the diameter of which is slightly greater than that of the ring 21 so that there is a small gap 24 to allow the ring 21 to move freely to take up its correctly aligned position with piston rod 14 without radial pressure. The annular ring 21 in conjunction with the retaining ring 23 also serves to retain the upper end of a spring loaded oil seal assembly indicated generally at 25, and comprising a rubber ring 26, of generally frusto conical form, the inner and outer surfaces of which are parallel and aligned at an acute angle to the axis of the piston rod to form an inwardly and downwardly directed lip 26a pressing against the piston rod 14. The lower side of the ring 26 is held in place by a retaining cup assembly 27 the inner diameter of which is slightly larger than the ring so that the lip 26a enters the gap between the cup 27 and the piston rod 14 and is pressed tightly into engagement with the piston rod. Thus when the shock absorber is being charged, as will be hereinafter described, gas can enter downwardly past the lip but is prevented from passing out. The cup 27 is acted upon by one end of a compression spring 28 the other end of which abuts against a washer 29, the internal diameter of which is greater than the piston rod to provide between it and the piston rod a gap 30. The underside of the washer 29 abuts against a shoulder 31 forming the base of an annular chamber 32 in which is contained the sealing assembly 25, in a housing 33. The housing 33 is held in place in the upper end of the working cylinder 10 by one or more indentations 34 in the cylinder wall abutting against the lower surface of the housing. Below the washer 29 is a second smaller annular chamber 35 housing a sealing ring 36 of generally annular form and having an annular groove 37 in its upper surface and a tapering portion 38 in its inner surface forming between them and inwardly and upwardly directed lip 40 in tight engagement with the piston rod 14. The ring 36 therefore allows fluid to pass upwardly into the chamber 32 via the gap 30 to maintain a predetermined correct level therein but prevents it from returning. The chamber 32 thus acts as a fluid reservoir to ensure adequate lubrication of the ring 26 and its associated lip 26a. A pressure relief passage 41 is provided in the housing 33 to prevent pressure build up due to thermal expansion of the fluid in the chamber 32 or excess fluid passing in via the one-way valve arrangement formed by the ring 36.

The housing 33 has an annular projection 42 acting as a piston rod guide arranged to fit into a piston spacer or cup 44 mounted on the lower end of the piston rod, the arrangement being shown more clearly in FIGURE 3, and serves to provide an effective hydraulic rebound check, as on the rebound stroke, i.e. when the piston moves toward the open end 13 of the cylinder 10 the flange 42 enters the spacer 44 and fluid can only escape from the annulus formed between the two mating surfaces. A pin 45 of slightly smaller diameter than the piston rod 14 passes through the lower part of the cup, is connected to the lower end of the piston rod 14 and has mounted on it a compression relief valve assembly to withstand violent shock loads indicated generally at 46 and comprising a compression spring 47 inside which is a sleeve 48 the upper end of which abuts against the underside of the cup 44 and retains it in position. The upper half 49 of the sleeve 48 is of larger diameter than the lower half 50, the lower half being surrounded by an annular ring 51 having a radially directed flange 52. The inner diameter of the ring 51 is of slightly larger diameter than the lower half 50 of the sleeve and can slide axially with respect thereto. The compression spring 47 is retained at its lower end by the upper side of the flange 52 and at its upper end by the underside of the cup 44. Mounted on the pin 45 below the sleeve 48 is a piston 53 having a piston ring 54 and provided with sets of openings 55 and 56 extending through it. The flow of fluid from the lower side to the upper side of the piston is controlled by the flange 52 acting as a valve which extends over the upper ends of the openings 56. The gap between the ring 51 and the lower half 50 of the sleeve 48 allows a limited flow or "bleed" without opening the valving. The flow of fluid from the upper side to the lower side of the piston through openings 55 is controlled by valving 57, comprising a metering spacer disc 58 having one or more bleed notches 59 in its periphery to allow for a limited flow of fluid through the valve without opening it. Below the disc 58 is a flat disc 60 acted upon by a star or other suitably shaped spring 61. All the components mounted on the pin 45 are held by a retaining nut 62 screwed onto the end of the pin 45.

The construction shown in FIGURE 4 is somewhat similar to that of FIGURE 1 and comprises a working cylinder 65 closed at its lower end 66 and extending through a fluid tight seal indicated generally at 67, in its upper end is a piston rod 68 having mounted on the lower end thereof a piston valve arrangement indicated generally at 70. The fluid tight sealing arrangement 67 which is shown in more detail in FIGURE 5 is somewhat similar to that shown at 12 in FIGURE 1 and comprises a flanged annular ring 71 similarly treated with self lubricating material the flange 71a of which is held in a similar manner to that of FIGURE 1 between the upper end 72 of the working cylinder 65 and a retaining ring 73, allowing the ring 71 a similar amount of radial free play between the upper end of the rod 68 and the ring 73. Below the ring 73 is a similar spring loaded oil seal assembly to that of the construction of FIGURES 1 to 3 and comprising a frusto conical shaped flexible rubber ring 74 held in position by a cup 75 which is in turn spring biassed by means of a compression spring 76 against the ring 73. The spring loaded oil seal assembly is similarly housed in an annular chamber 77 formed in the upper end of a housing 78, having an axially extending annular part 80.

The lower end of the piston rod carrying the piston and valve arrangement 70 is shown more clearly in FIGURE 6 and comprises a piston 81 having a piston ring 82 and provided with passages 83 through which fluid can travel from the upper to the lower side of the piston and passages 84 through which fluid can travel from the lower to the upper side of the piston. The passages 83 are controlled by a valving arrangement similar to that of the construction shown in FIGURES 1 to 3 and comprising an annular metering spacer 85 and a disc 86 normally held closed by a star or similarly shaped spring 87. Below the spring 87 is a spacing washer 88 and a control washer 89 the latter serving to prevent the discs 85 and 86 moving too far and becoming strained. The piston and valving arrangement is similarly held in position on a pin 91 of slightly smaller diameter than the piston rod 68 and connected to the end thereof, the piston and valving arrangement being held in position by a retaining nut 92 on to the end of the pin 91.

Mounted above the piston 81 is a sleeve 95 having an inwardly extending radially directed flange 96 at its lower end held between the upper face of the piston 81 and the lower end of the piston rod 68 and at its upper end an outwardly extending radially directed flange 97. The lower end 98 of the sleeve is of a smaller diameter than the upper end and around which extends an annular ring 99 arranged to slide with respect to the part 98 in an axial direction with a small annular gap between them to allow limited bleed. The ring 99 has a radially directed flange 100 arranged to close the openings 84 in the piston and biased towards the piston 81 by means of a compression spring 101 one end of which is contained by the upper side of the flange 100 and the upper end of which is held by the lower side of the flange 97.

Mounted in each end of the working cylinder are spring retained members to limit the free movement of the piston after a prescribed distance has been travelled in either direction. The upper spring retained member comprises a spring 102 retained at its upper end in a groove 103 in the axial extending part 80 of the housing 78 and at its lower end in a groove 104 in an annular ring 105 arranged to slide in the working chamber in an axial direction with respect thereto. The lower end of the ring 105 is provided with metering notches 106 the number and size of which are determined by correct control requirements of the wheel movements of a vehicle upon which the shock absorber is mounted.

The lower spring retained member is of similar construction to the upper member and comprises a spring 107 held at its lower end in a groove 108 in a retaining member 110 and at its upper end in a groove 111 in an annular ring 112 movable in an axial direction. Similar metering notches 113 are provided in the ring 112. Thus when the piston comes into contact with either of these members the hydraulic resistance is increased many times. The upper and lower members are provided with sealing faces 114 and 115 across which the metering notches 106 and 113 respectively are milled diametrically. If there were no such notches a solid block of fluid would be compressed as the shock absorber continued to expand or compress after the piston had touched the sealing members. The size and number of the notches on the sealing members determines the degree of hydraulic force which will be applied when the piston and spring retained members meet.

While separate constructions of piston and valving arrangements have been shown in FIGURES 1 to 3 and 4 to 6 the piston and valve arrangements indicated at 15 and 70 in these figures may be replaced by either of the constructions shown in FIGURES 7 or 8 and 9.

The piston and valve arrangement shown in FIGURE 7 comprises a piston 120 mounted on a pin 117 connected to the end of the piston rod 119 and arranged to slide in a cylinder 121, only a part of which is shown, the piston having a number of passages 122 through which fluid can flow from the under side of the piston to the upper side and passages 123 through which the reverse direction of flow can take place, each set of passages opening into shallow annular troughs on each face of the piston separated by annular lands 124 and 125. The valve assembly controlling the flow through the passages 122 comprises a metering disc 126 having notches 128 in its periphery and a retaining disc 127 mounted above it, the discs being held in place by a star or other suitably shaped spring 130. The metering notches extend from the lands 124 over the inner set of holes so that limited flow of fluid can take place without opening the valving. The construction of the valving controlling the passages 123 is somewhat similar and comprises again to spring discs 131 and 132 below which is mounted a star or other suitably shaped spring 133 while the spring discs 131 are provided with metering or bleed notches 134 serving the same purpose as that described in relation to the valve arrangement controlling the flow through the passages 122. The piston and valing is held on the pin 117 by a nut 118a screwed on to the end of the pin 117.

The dual piston arrangement shown in FIGURES 8 and 9 comprises an upper piston 135 having two rings of openings 136 and 137 formed therein and arranged at different radii from the centre of the piston and having between them an annular land 138. On each face of the piston 135 is a valve assembly for controlling the flow of fluid through one ring of openings. The valve assembly on the upper face of the piston controls the set of openings 136 and comprises a metering spacer 141 in the form of a flat circular disc with bleed notches in its peripheral edge and of a radius such that its peripheral edge rests on the land 138, the notches being sufficiently deep to extend beyond the land and over the inner set of holes. The metering spacer 141 is held in place by a disc 142 acted upon by a spring 143. Thus the disc 142 normally closes the openings 136 except for a limited flow which can take place through the bleed notches without opening the valve i.e. without moving the disc 142.

The valve assembly on the lower face of the piston 135 comprises a second flat disc 143 having an almost complete annular groove 144 therein so positioned that it lies over the inner set of openings 136 and allows passage of fluid therethrough without interference while controlling the flow through the outer set of openings 137. The second disc 143 which constitutes a transfer valve is similarly held in place by means of a lightly loaded star shaped spring 145 and is arranged to control the flow of the fluid through the outer ring of holes 137.

Below the first piston and spaced therefrom is a support washer 146 for limiting the movement of the spring 145 and disc 143, and below this and spaced therefrom is a second piston 147 having a valve assembly precisely the same as the valve assembly associated with the piston 135, except that it is inverted, and in which like parts are therefore given the same reference numerals and will not again be described. The whole piston and valve assembly is, as in the other constructions, held in place by a nut 148 screwed to the end of a pin 149 which is in turn connected to a piston rod 150.

After the parts have been assembled either as shown in FIGURES 1 and 4 or with the substitution of the piston and valving of FIGURES 7 or 8 and 9 the space in the cylinder not occupied by the piston assembly and the piston rod is charged with hydraulic fluid but a space is left equivalent to the volume of the piston rod plus an allowance for fluid expansion at operating temperatures. This space is charged with gas by placing the shock absorber in a chamber which is sealed to atmosphere. Nitrogen has been found to be a suitable gas, although air may equally well be used, and when in this chamber it passes through the sealing lip of the ring 26 or 74 to enter the shock absorber until the prescribed pressure is reached and as explained above the seal acts as a one-way valve allowing the pressurized gas to pass in but preventing its exit. The volumetric proportions of shock absorber fluid to gas is a minimum of 7 to 1 and a maximum of 9 to 1 and a suitable hydraulic fluid is a conventional light mineral oil with additives for lubricity, pourpoint and oxidization and the pressure to which the shock absorber is charged may vary between 80 lbs. to 500 lbs. p.s.i. When the shock absorber has been operating for quite a short time the gas becomes thoroughly mixed with the oil in the form of small bubbles but, because they retain their pressure, the mixture of entrained pressurized gas and hydraulic fluid forms an emulsion constituting a perfectly acceptable hydraulic medium.

The operation of the constructions shown in FIGURES 1 to 3 and 4 to 6 is similar as is as follows: where the piston is moved slowly with respect to the cylinder the fluid passes, on the outward stroke, respectively through the openings 55 and 83 and through the bleed notches 59 and 85 and, on the inward stroke through the passages 56, 84 and through the bleed space between the ring 52, 100 and the sleeve 46, 95. When the speed at which the piston rod is moved with respect to the operating cylinder increases to that at which the rate of displacement of fluid by the piston assembly is too high for it to be accommodated by the bleed notches and spaces, the pressure of fluid becomes sufficiently great to open the transfer valving on the appropriate side of the piston.

The operation of the construction shown in FIGURE 7 is similar to that of the constructions described above, except that the same type of valving is provided on each side of the piston and the operation of which is similar to the valving operating to control the flow of fluid through the passages 55 and 83.

The operation of the construction shown in FIGURES 8 and 9 is as follows: When the piston rod is slowly withdrawn from the pressure cylinder on what will be termed the rebound stroke, (i.e. downwards with respect to the drawings), the fluid passes through the openings 137 forming the outer ring in the lower piston to raise the light loaded transfer valving and then passes through the inner ring of openings 136 in the upper piston, through the bleed notches and into the part of the cylinder on the other side of the piston. When the speed at which the piston rod is withdrawn from the operating cylinder increases to that at which the rate of displacement of fluid by the piston assembly is too high for it to be accommodated by the bleed notches, the pressure of fluid becomes sufficiently great to open the valve against the spring on top of the second piston.

A similar sequence of operations takes place on the compression stroke where for slow movement of the piston rod the fluid passes through the openings 137 forming the outer ring in the upper piston and through the bleed notches in the inner openings 136 in the lower piston, while for more rapid movement the valving on the bottom of the lower piston opens as shown in FIGURE 9.

In each construction when the shock absorber is operating at still higher velocities such that the pressure of the air in the fluid reaches an upper limit the above method of operation no longer applies. Thus when the piston velocity becomes high enough the friction of the fluid passing through the valve system and bleed notches is so great that the effect is almost that of a solid piston. In these circumstances fluid will not pass through the piston and valving at a rate equivalent to piston displacement and the fluid in the emulsion will therefore exert an increasing pressure on the gas until a point is reached when the gas pressure is again greater than the resistance offered by the piston valving whereupon fluid will once more flow through the valving. The lag occurring at these high velocities, and representing a degree of compression of the elastic emulsion constituting the fluid, will in effect be undamped movement of the piston. In practice in a vehicle wheel suspension this undamped movement provides a very desirable characteristic allowing the wheel to move elastically for a short distance on both compression and rebound movements.

The shock absorber can be used either way up i.e. either end can be mounted to the sprung or unsprung mass of a vehicle but is particularly applicable where it is desired to mount the piston rod attached to the sprung mass, as heretofore pressurized shock absorbers have had to be mounted with the piston rod attached to the unsprung mass to ensure that the fluid seal is adequately lubricated. By the present constructions the fluid seal is adequately lubricated in the upright position and it is not necessary to be inverted to be adequately lubricated.

What I claim as my invention and desire to secure by Letters Patent is:

1. In a hydraulic shock absorber including a cylinder, a piston assembly arranged to slide in said cylinder and having at least one passage therein offering resistance to the flow of fluid from one side thereof to the other, said cylinder constituting the working chamber and having one end closed, a piston rod extending through sealing means in the other end, said sealing means comprising a housing containing a chamber extending around the piston rod, said chamber having at its inner and outer ends seals surrounding the piston rod, the inner seal permitting flow or fluid into said chamber from the interior of the cylinder but preventing its return thereto and the outer seal preventing flow of fluid out of said chamber but permitting flow into the chamber from outside the shock absorber and a passage for fluid flow from the said chamber back into the working chamber.

2. A hydraulic shock absorber as claimed in claim 1 in which said outer seal comprises a sealing ring of flexible material surrounding the piston rod and having an inner surface of frusto conical shape, the larger diameter end of which is of greater diameter than the piston rod and faces the outer end of the piston rod while the smaller diameter end is in a state of circumferential tension around the piston rod, said inner seal comprising a sealing ring of flexible resilient material surrounding the piston rod and having a lip directed into said chamber.

3. A hydraulic shock absorber as claimed in claim 1 in which said passage communicates with said chamber adjacent its outer end.

4. A hydraulic shock absorber as claimed in claim 2 in which said passage communicates with said chamber adjacent its outer end.

References Cited by the Examiner

UNITED STATES PATENTS

| | | | |
|---|---|---|---|
| 2,138,513 | 11/1938 | Rossman et al. | 188—88 |
| 2,476,324 | 7/1949 | Reich | 188—100 |
| 2,507,266 | 5/1950 | Patriquin | 188—100 |
| 2,527,034 | 10/1950 | Rossman | 188—100 |
| 2,599,477 | 6/1952 | Patriquin | 188—88 |
| 2,740,500 | 4/1956 | Brundrett et al. | 188—88 |
| 2,774,447 | 12/1956 | De Carbon | 188—100 |
| 3,139,159 | 6/1964 | Lob | 188—100 |

FOREIGN PATENTS

| | | |
|---|---|---|
| 586,346 | 12/1958 | Italy. |
| 942,959 | 2/1949 | France. |
| 678,804 | 9/1952 | Great Britain. |

MILTON BUCHLER, *Primary Examiner.*

ARTHUR L. LA POINT, *Examiner.*

R. FIELD, G. HALVOSA, *Assistant Examiners.*